Patented Apr. 27, 1937

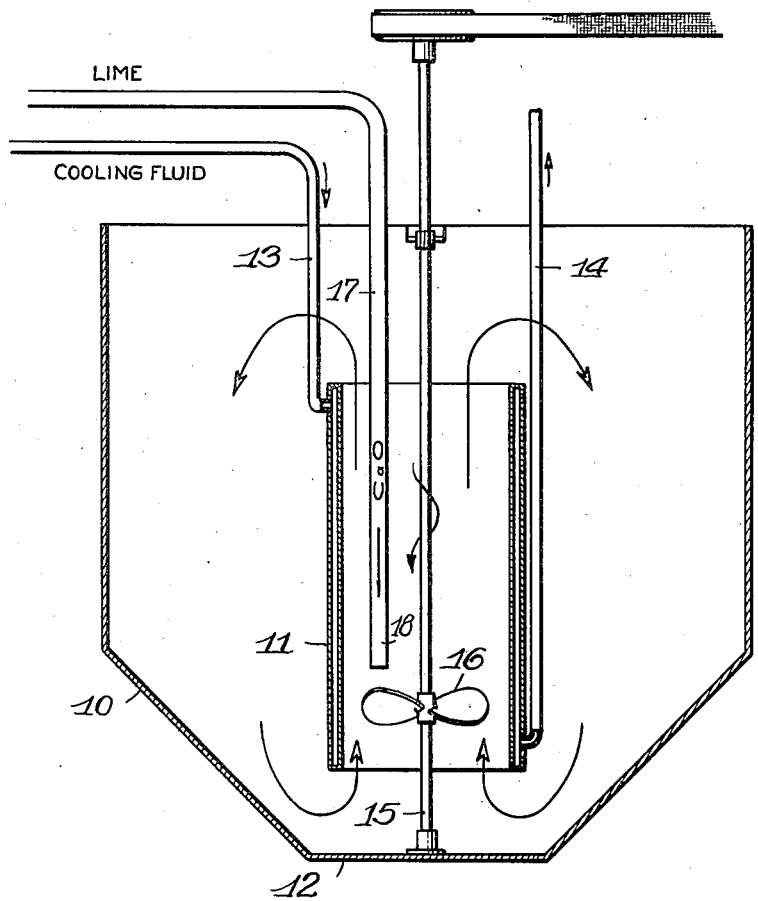

2,078,627

UNITED STATES PATENT OFFICE 2,078,627

MANUFACTURE OF DICALCIUM PHOSPHATE

Louis Block and Max Metziger, Joliet, Ill., assignors to Blockson Chemical Co., Joliet, Ill., a corporation of Illinois Application June 7, 1934, Serial No. 729,358

12 Claims. (Cl. 23—109)

The present invention relates to the manufacture of dicalcium phosphate and equivalent compounds of the alkaline earths.

The process involves the manufacture of material like dicalcium phosphate by the addition of a reactive form of alkali earth metal oxide, usually milk of lime, to a solution containing essentially a salt such as monosodium phosphate. The monosodium phosphate or its equivalent may be made by adding alkali metal bases, preferably a carbonate of sodium, to commercial phosphoric acid or to certain acid phosphate salts. The commercial phosphoric acid is usually made by digesting phosphate rock with sulphuric acid. Phosphate rock is fundamentally tricalcium phosphate commonly containing certain impurities, such as aluminum phosphate, iron phosphate, calcium fluorides and other materials usually of minor importance. Dicalcium phosphate as usually made is highly impure with appreciable quantities of aluminum phosphates, iron phosphates and fluorides, and in addition with tricalcium phosphate which is produced as an undesired impurity in the process intended to produce primarily the dicalcium phosphate.

The present process aims to manufacture the dicalcium phosphate and at the same time to minimize the formation of tricalcium phosphate. The process of the present invention is so carried out as to minimize the incorporation of the iron and aluminum phosphates, the fluorides and other impurities in the desired product.

One object of the invention is to carry out the reaction with lime in such a way as to favor the reaction to form dicalcium phosphate and to suppress reactions forming tricalcium phosphate.

An object of the invention is to control the temperature and other conditions prevailing at the time the lime is added, thereby to lessen the formation of tricalcium phosphate.

Another object of the invention is to effect crystallization of disodium phosphate as it is formed, thus to remove it from the sphere of reaction and as a dissolved salt in the liquid.

Still another object is to control the acidity of the solution at various stages in the process to aid in excluding impurities.

A particular object of the invention is the use of a quantity of lime to be added, which is short of the amount which might be added, thereby to maintain at the end of reaction a substantial effective amount of monosodium phosphate.

Still another object of the invention is to add lime to a solution containing a substantial amount of monosodium phosphate which solution is saturated at low concentration with disodium phosphate.

A particular object of the invention is substantially to prevent precipitated dicalcium phosphate from reacting with the free lime to form tricalcium phosphate, by maintaining in the solution a substantial and effective quantity of monosodium phosphate or its equivalent as a preferential and a more reactive material for the lime.

In describing the invention and in referring to the preferred practices in operating it, the monosodium phosphate is specifically mentioned. However, it is to be understood that sodium is merely an exemplary and a practical and cheap representative of the alkali metals of which potassium is the next most common.

When free lime is present in monosodium phosphate it is possible to produce both dicalcium phosphate and tricalcium phosphate, which are insoluble. It has been discovered that the formation of tricalcium phosphate takes place not only from reaction of lime with soluble phosphate salts, but also by reaction of lime with the insoluble dicalcium phosphate. In view of this knowledge the present invention aims so to conduct the process that the desired dicalcium phosphate is protected from reactions to convert it into the undesired tricalcium phosphate. As lime is added to a monosodium phosphate solution there is less acid present. The monosodium phosphate gives up part of the phosphoric acid which is tied to the sodium, forming disodium phosphate. This is a less acid salt than is the monosodium phosphate. In the process of this invention, the solution which reacts with lime is changed from one originally high in monosodium phosphate, to one which has a decreasing content of monosodium phosphate and an increasing content of disodium phosphate.

It has been found that it is the reaction between lime and monosodium phosphate which favors the formation of dicalcium phosphate. It has also been found that the less there is of disodium phosphate present, the less tricalcium phosphate forms. Accordingly, then the process involves steps taken to favor reaction of lime with monosodium phosphate, and to minimize the reaction of lime with disodium phosphate. One way of securing the favored reaction is to lessen the quantity of lime, thereby keeping a higher content of monosodium phosphate. By having present a quantity of monosodium phosphate the dicalcium phosphate is effectively prevented from reacting with lime to form tricalcium phosphate. By the law of mass action the reaction desired is thus made to proceed more rapidly. One way to avoid the reaction of disodium phosphate with lime, is to remove disodium phosphate from solution. This salt crystallizes readily, and therefore concentrations and temperatures are chosen which favor formation of crystals of disodium phosphate. Another aspect of this control in the removal of the disodium phosphate is the prevention of decreased acidity of the remainder of the solution. The hydrogen ion concentration of the reacting solution is thus largely due to the monosodium phosphate, and the acidity due to this salt favors the formation of the dicalcium phosphate rather than the tricalcium phosphate.

The process may be carried out in numerous ways and in numerous kinds of apparatus by those so skilled in the art as to be familiar with the principles of the process as above described. In order better to illustrate the invention and further to explain its character, the following procedure is given as the presently preferred manner of operating the process commercially to produce an improved commercial type of dicalcium phosphate. The process is described with reference to the apparatus shown in the accompanying drawing. Such apparatus is designed and employed to facilitate carrying out the process as will be readily understood.

A commercial phosphoric acid is used, such as one made by the sulphuric acid digestion of phosphate rock. Thus there may be present the aforementioned impurities, and others. To about a solution containing 20% of $P_2O_5$ (26° to 30° Bé. measured at about 20° C.) there is added with strong agitation sufficient sodium alkali, such as sodium carbonate, to form monosodium phosphate. Exact chemical equivalents are not required, so that there may be a slight excess of phosphoric acid, or a slight excess of alkali, in which case the excess alkali is present as disodium phosphate. The resulting liquor has a specific gravity of about 25° Bé. measured at about 20° C. corresponding to about 25% of anhydrous monosodium phosphate. Where the said impurities of phosphoric acid are present, there is a voluminous suspension of insoluble impurities in this solution of near-monosodium phosphate. The suspended matter may be filtered off directly, or the liquid may be concentrated to about 50° Bé., thus to cause more impurities to become insoluble for a filtering separation from the near-monosodium phosphate liquor.

The clarified near-monosodium phosphate liquor is then cooled, and if required, is diluted to about 25° Bé., corresponding to about 25% near-monosodium phosphate.

The next step is the addition of lime, preferably as milk of lime, and the maintenance of conditions favoring crystallization of disodium phosphate, which builds up in amount, as lime is added. Cooling the mass accomplishes this, and obviously cooling is not wholly effective until a crystallizable content of disodium phosphate has been reached. In practice for the solution described, a cooled reaction vessel is used, and precooled milk of lime is added slowly. It is preferred that the temperature does not rise above 16° C. to 18° C. for the 25° Bé. solution employed. The milk of lime may be cooled in advance to about 10° C. to 12° C. Since the reaction resulting from adding lime produces disodium phosphate, the whole mass is strongly agitated to effect dilution and distribution of the disodium phosphate; in other words to avoid local regions of higher concentration of disodium phosphate. Such dilution minimizes reactions involving disodium phosphate. The rapid mixing is furthermore important in order to cause the presence of an appreciable quantity of monosodium phosphate which effectively prevents the newly formed dicalcium phosphate from reacting with the lime. This in effect hastens the reaction involving lime and monosodium phosphate, thus to remove active lime from the mass.

In practice a conical bottomed tank 10 is employed as a container for the solution of near-monosodium phosphate. A double-walled cylinder 11 is set in the container above the bottom 12 of the container. Cooling fluid enters and leaves the space between the walls of the cylinder by means of pipes 13 and 14. A rotary shaft 15 bears in the container-bottom 12 and has a propeller or other means 16 adapted to impel liquid upwardly through the cylinder 11. Thus, fast circulation, and cooling are effected. A pipe 17 enters the cylinder terminating at 18, just above the propeller. Milk of lime is fed through the pipe 17. The cylinder 11 may be about 3 feet in diameter which dimension gives the general proportions of the apparatus. Where 3600 gallons of 25° Bé. near-monosodium phosphate liquor is employed, there may be added about 1290 gallons of milk of lime, prepared by slaking about 1640 lb. of commercial quick lime.

The cooled lime is added slowly or gradually in about 4 hours as the agitating device is operated at high speed. This assures intimate contact between the lime and fresh strong supplies of monosodium phosphate, and minimum effective concentration of disodium phosphate. The temperature is not allowed to rise over 25° C., and is preferably much lower. Under the conditions described the disodium phosphate does not crystallize when the temperature is higher, and 25° C. is about the limiting temperature. The lower the temperature, the more quickly will the disodium phosphate crystals form. The more these form, the more effective is the monosodium phosphate in the reaction with lime, even though its concentration diminishes.

Of course, some disodium phosphate remains in solution in spite of the fact that some also crystallizes. If the reaction is allowed to go to completion by having sufficient lime present, all of the monosodium phosphate will be used up, and the dissolved portion of disodium phosphate will then act with the lime. At the same time the precipitated dicalcium phosphate will act with the lime forming tricalcium phosphate, because its protector, the monosodium phosphate, has been used up. Thus, it will be seen that after the process is practically complete, with much dicalcium phosphate and little tricalcium phosphate present in precipitated form, the use of a very small amount of lime at the end, will, if it exceeds the necessary amount, not only destroy the desired dicalcium phosphate, but will add to the undesired tricalcium phosphate. This condition is avoided by adding insufficient lime, so that monosodium phosphate remains in solution when all the lime has been used up.

The more of the monosodium phosphate which remains, the less will be the impurity of tricalcium phosphate. I may therefore control the character of the product by regulating the deficiency of lime. In practice I prefer to use 3% deficiency. This may be determined by analytical control. By knowing the content of phosphate in the near-monosodium phosphate liquor, the required amount of lime for forming dicalcium phosphate may be determined. About 97% of this amount is chosen, but this is not a limiting amount. As a result, about 3% of the monosodium phosphate will remain.

After the reaction is complete, the mass will contain dissolved monosodium phosphate, some disodium phosphate, undissolved insoluble dicalcium phosphate, and soluble crystals of disodium phosphate. The mass is then heated within a heating period of about one hour to a temperature sufficient to dissolve the crystals of disodium phosphate, such as from 40° C. to 45° C. Heat and time are operative on the final mass to cause a shift in the equilibrium status of the ingredients. Rapid heating is therefore desirable and not too high a temperature. The temperature and time specified are not critical, but for the batch described, a longer period or a higher temperature tends to produce permanence in the shift of equilibrium so that more tricalcium phosphate forms. The dicalcium phosphate with very small and variable quantities of tricalcium phosphate remain suspended and may be recovered by filtering and washing. The product is quite free from aluminum and iron salts and from fluorides, and is low in content of tricalcium phosphate.

Where a very high degree of purity and of freedom from tricalcium phosphate is desired, different procedure is employed. The impurities dissolved in the monosodium phosphate will on the addition of lime, show a preference for the precipitate and will be found largely in the first-formed precipitate. The later-formed precipitate will be much purer. Therefore, the precipitate is fractionally separated from the mass as it is formed, and the fractions increase in purity. For example, about one-half of the above described amount may be used, and the dicalcium phosphate removed as described. This is the most impure. The residual liquor from the removal step may be used again in the reaction vessel after cooling and another fraction, or all of the remainder of the lime may be added. These are the purer fractions. If desired, the residual liquor may be concentrated somewhat, in view of the decreased content of phosphate occasioned by the prior formation of the dicalcium phosphate. Where the dicalcium phosphate is formed as above described by using about half or a like near fraction of the lime, in two portions, the product of the second precipitation is practically free from iron, alumina, and fluorides.

The residual liquor at any step of separation from dicalcium phosphate contains a substantial amount of disodium phosphate. This may be used for addition to more phosphoric acid in the formation of the near-monosodium phosphate, and may be used with the phosphoric acid and the sodium carbonate originally referred to in connection with the preparation of the near-monosodium phosphate, or may be used alone with phosphoric acid to form more monosodium phosphate.

In order to explain more fully what takes place, so that permissible variations may be practiced, the following statements are made. Both the monosodium phosphate and the disodium phosphate act together in solution as buffers to regulate the hydrogen ion concentration, or degree of acidity. In the beginning the hydrogen ion concentration is about 4.5 pH and is due largely to the near-monosodium phosphate. Shortly, however, in the course of the process, the disodium phosphate also acts to control the hydrogen ion concentration. The content of disodium phosphate increases, and at the end of the process the solution is close to the neutral point, being just above it and around pH of 7.3. As the mass is cooled the concentration at which saturation occurs is lowered, thus tending to keep the solution lower in pH. After the saturation point is reached, the solution remains saturated with disodium phosphate and all the excess crystallizes out as it is formed. Since the normal pH of the buffering salt disodium phosphate is above pH of 8, it is to be understood that the residual monosodium phosphate at the end of the process buffers the solution towards acidity.

It will thus be understood that the proportions of disodium phosphate and monosodium phosphate in solution at the end of the reaction are sufficient to cause the predominating reaction to be that involving the monosodium phosphate. The presence of monosodium phosphate at the end of the process assures against conversion of dicalcium phosphate to tricalcium phosphate, and in the presence of lime, the agitation also gives added assurance. It can therefore be readily understood that 3% deficiency, or any other percentage is not a critical limit. Not only the temperature, but the water dilution of the mass is effective to control the predominance of the reaction. Also it is important where materials are mechanically mixed, that disadvantageous localized changes in the liquid do not occur through improper agitation.

With the foregoing explanation in mind, one may readily carry out the process in a variety of ways, and may apply the principles involved, and the procedure to the use of barium, and strontium bases as well. Accordingly, in the accompanying claims the invention is expressed in terms of the oxides of the alkali metal earths, but they are more particularly directed to calcium.

We claim:

1. The process of forming dicalcium phosphate which comprises gradually adding calcium oxide to a solution of essentially monosodium phosphate under conditions which effect crystallization of some of the resulting disodium phosphate, and stopping the addition of calcium oxide while a substantial amount of monosodium phosphate remains.

2. The process of forming dicalcium phosphate which comprises gradually adding calcium oxide to a solution of essentially monosodium phosphate whereby to form dicalcium phosphate and disodium phosphate, simultaneously cooling the reacting mass to effect crystallization of some of the resulting disodium phosphate continuing the addition of lime after such crystallization and stopping the addition of calcium oxide while an effective quantity of monosodium phosphate remains in solution to react with calcium oxide as the predominant reaction.

3. The process of forming dicalcium phosphate which comprises gradually adding calcium oxide to a solution of essentially monosodium phosphate, whereby to form dicalcium phosphate and disodium phosphate, and before completing the addition of lime, cooling the mass to effect crystallization of some of the resulting disodium phosphate in the presence of dicalcium phosphate, continuing the addition of lime in the presence of crystallized disodium phosphate, stopping the addition of calcium oxide while a substantial amount of monosodium phosphate remains, and thereafter removing the water-soluble constituents of the mass to provide a relatively pure dicalcium phosphate.

4. The process of forming dicalcium phosphate which comprises gradually adding calcium oxide to a solution containing about 25% monosodium phosphate, maintaining the temperature of the reacting mass at not over 25° C., whereby after sufficient lime is added to crystallize some of the resulting disodium phosphate in the presence of formed dicalcium phosphate, continuing the addition of lime after the crystallization of disodium phosphate, and stopping the addition of lime while monosodium phosphate remains in solution to react with calcium oxide as the predominant reaction.

5. The process of forming dicalcium phosphate which comprises gradually adding calcium oxide to a solution containing about 25% monosodium phosphate, and maintaining the temperature of the reacting mass at about 16° to 18° C., whereby after sufficient lime is added to crystallize some of the resulting disodium phosphate in the presence of formed dicalcium phosphate, continuing the addition of lime after the crystallization of disodium phosphate, and stopping the addition of lime while monosodium phosphate remains in solution to react with calcium oxide as the predominant reaction.

6. The method of forming dicalcium phosphate which comprises gradually adding calcium oxide to a solution containing monosodium phosphate which solution is saturated with disodium phosphate forming dicalcium phosphate and disodium phosphate, whereby a quantity of disodium phosphate is caused to crystallize, and stopping the addition of lime while monosodium phosphate remains in solution to react with calcium oxide as the predominant reaction.

7. The method of forming dicalcium phosphate which comprises gradually adding calcium oxide to a solution containing monosodium phosphate which solution is saturated with disodium phosphate forming dicalcium phosphate and disodium phosphate, whereby a quantity of disodium phosphate is caused to crystallize, simultaneously cooling the mass whereby to lower the saturation point for the disodium phosphate, and stopping the addition of lime while monosodium phosphate remains in solution to react with calcium oxide as the predominant reaction.

8. The process of forming dicalcium phosphate which comprises adding a sodium base alkali to phosphoric acid whereby to form near-monosodium phosphate, removing solid matter from the mass which results from impurities in the reacting materials, adding lime slowly to the liquid under conditions causing crystallization of some of the resulting disodium phosphate, and stopping the addition of lime while there is present a substantial and effective quantity of monosodium phosphate dissolved in a saturated solution of disodium phosphate, such that the monosodium phosphate provides the predominant reaction with lime.

9. The process of forming dicalcium phosphate which comprises adding a sodium base alkali to phosphoric acid whereby to form near-monosodium phosphate, removing solid matter from the mass which results from impurities in the reacting materials, adding lime slowly to the liquid under conditions causing crystallization of some of the resulting disodium phosphate, while simultaneously cooling the mass to lower the saturation concentration for disodium phosphate, and stopping the addition of lime while there is present a substantial and effective quantity of monosodium phosphate dissolved in a saturated solution of disodium phosphate, such that the monosodium phosphate provides the predominant reaction with lime.

10. The process of forming dicalcium phosphate which comprises gradually mixing lime with a solution of essentially near-monosodium phosphate in which resulting disodium phosphate may crystallize in the presence of monosodium phosphate, continuing the addition of lime to produce crystallization of disodium phosphate, stopping the addition of lime while monosodium phosphate remains as a protective agent to provide the predominant reaction with lime, heating the mass to dissolve the crystals of disodium phosphate, and filtering the solid from the liquid whereby to recover essentially dicalcium phosphate.

11. The method of forming dicalcium phosphate which comprises adding calcium oxide slowly to about a 25% solution of near-monosodium phosphate at a temperature under about 25° C. such that resulting disodium phosphate will crystallize from solution, the amount of calcium oxide added being not over that corresponding to 97% of the original monosodium phosphate, and separating the precipitated dicalcium phosphate from the solution and the residual disodium phosphate and monosodium phosphate.

12. The method of forming dicalcium phosphate which comprises gradually adding calcium oxide slowly to about a 25% solution of near-monosodium phosphate at a temperature not over about 16° C. to 18° C. forming dicalcium phosphate and disodium phosphate, said conditions being such as early to form a saturated solution of disodium phosphate, continuing the addition of lime whereby resulting disodium phosphate will crystallize in part, the total amount of calcium oxide added being not over that corresponding to 97% of the original monosodium phosphate, and separating the precipitated dicalcium phosphate from the solution and the residual disodium phosphate and monosodium phosphate.

LOUIS BLOCK.
MAX METZIGER.